(No Model.)
L. H. SCHMITT.
TOOL HANDLE.
No. 522,031. Patented June 26, 1894.
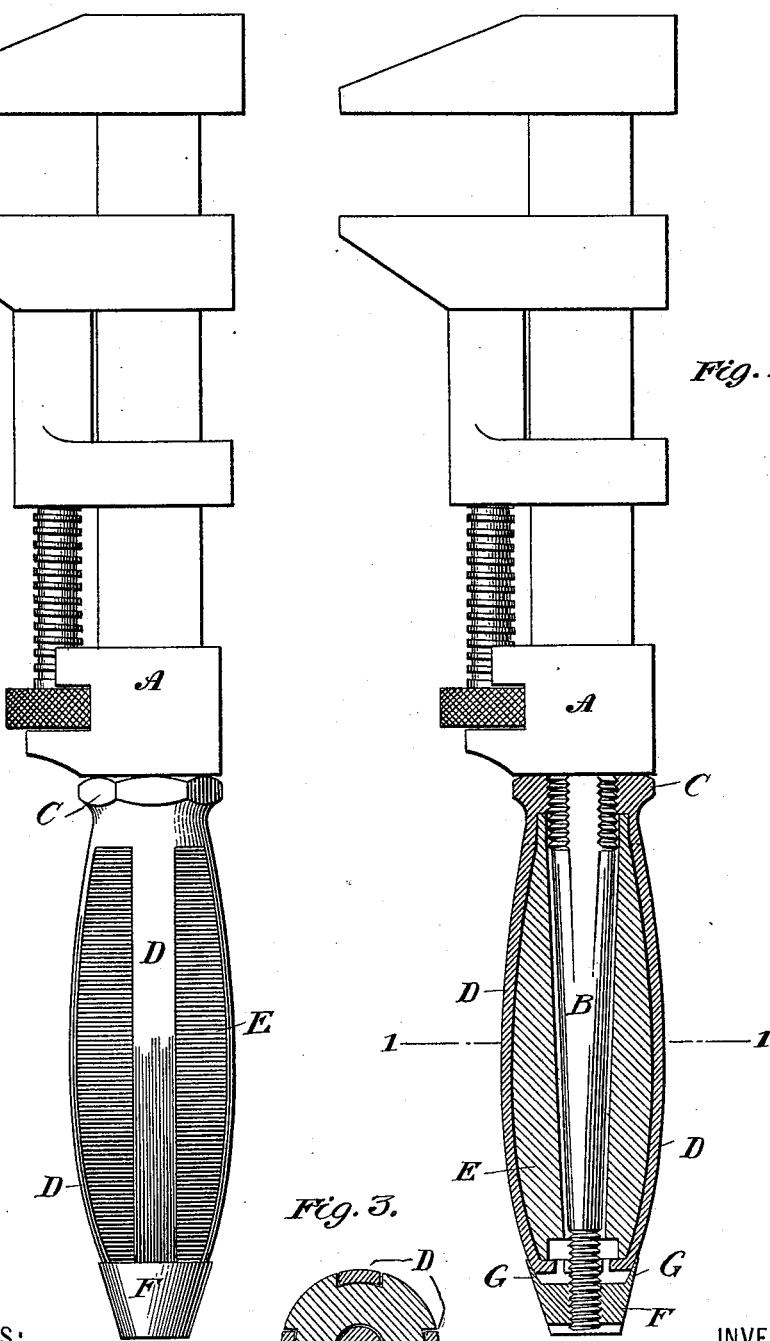
WITNESSES:
INVENTOR
Louis H. Schmitt.
BY
ATTORNEY

UNITED STATES PATENT OFFICE.

LOUIS H. SCHMITT, OF NEW YORK, N. Y., ASSIGNOR OF ONE-HALF TO GEORGE E. STERNBERG, OF SAME PLACE.

TOOL-HANDLE.

SPECIFICATION forming part of Letters Patent No. 522,031, dated June 26, 1894.

Application filed January 4, 1894. Serial No. 495,593. (No model.)

*To all whom it may concern:*

Be it known that I, LOUIS H. SCHMITT, a citizen of the United States, residing at New York, in the county and State of New York, have invented a new and useful Tool-Handle, of which the following is a specification.

My invention relates to an improved tool-handle to be used in connection with wrenches, meat-cleavers and the like.

My invention consists in making a novel and useful mechanism for strengthening the handle, the said mechanism being a component part of the handle.

The object of my invention is to construct a handle in such a manner that it shall have great strength and cannot be easily broken, thereby being of particular value when used in connection with a tool that is subjected to severe strain, such as, for instance, a wrench.

My invention is illustrated by the accompanying drawings, in which—

Figure 1 is a side elevation of a wrench provided with my improved handle. Fig. 2 shows a longitudinal section of my invention. Fig. 3 is a cross section of the handle taken on the plane of the line 1—1 Fig. 2.

Similar letters refer to similar parts throughout the several views.

The handle is shown attached to a wrench A, the shank of the wrench being marked B.

C is a metal ring adapted to pass over the shank B.

D D are tines formed homogeneous with the ring C. By preference I make use of two or more tines D D. The outer ends of these tines are by preference bent inward as shown in Fig. 2 of the drawings.

E is an ordinary handle formed from wood, rubber or other suitable material and in the sides of said handle are formed longitudinal channels to receive the tines D D and to permit the said tines to lie flush with the surface of the handle E. The said handle E is inserted between the tines D D and the outer ends of the said tines are clamped together or fastened together by a suitable collar, thereby securely holding the parts together.

I have illustrated the preferred specific form of invention. The handle E is bored throughout its entire length to permit the shank B of the wrench to pass entirely through and project a slight distance beyond the outer end of the said handle. The shank B by preference tapers outwardly and is provided at each end with screw threads. The ring C is adapted to be screwed on to the inner end of the shank B.

F is a nut adapted to be screwed on to the outer threaded end of the shank B. The end of the nut F adjacent to the end of the handle E is provided with a flange G which, when the nut is screwed into place, acts as a collar to clasp the ends of the tines D D and securely hold them together.

Having thus described my invention, what I claim, and desire to secure by Letters Patent, is—

1. The combination of the threaded tool-shank, the threaded collar having formed integral therewith the longitudinal tines grasping a channeled handle E with means as described to secure the outer ends of the tines, substantially as described.

2. The combination in a tool handle of the handle E channeled to receive two or more tines, said tines being attached at their inner end to a collar C and having their outer ends bent inwardly at substantially right angles and fastened for the purpose of preventing the handle E from slipping out, substantially as described.

3. The combination in a tool handle of the threaded tool shank adapted to extend entirely through a handle, with the collar C adapted to fit over the tool shank, and the longitudinal tines secured together at the outer end of the handle by a nut provided with an upwardly projecting flange, substantially as and for the purpose described.

4. The combination in a tool handle of the threaded shank, extending through and slightly beyond the handle E, with the collar C screw-threaded to fit over the shank B, and having formed integral therewith the longitudinal tines adapted to lie in channels in the side of the handle, and with the nut adapted to screw on to the tool shank, said nut being provided with the upwardly projecting flange, substantially as and for the purpose described.

LOUIS H. SCHMITT.

Witnesses:
R. C. MITCHELL,
JOHN KENNY, Jr.